US008533374B1

(12) United States Patent
Gipp et al.

(10) Patent No.: US 8,533,374 B1
(45) Date of Patent: Sep. 10, 2013

(54) TECHNIQUES FOR ADAPTIVE DATA TRANSFER

(75) Inventors: Stephan Kurt Gipp, Inver Grove Heights, MN (US); Jeremy Howard Wartnick, Minnetonka, MN (US)

(73) Assignee: Symantec Corporation, Mountain View, CA (US)

( * ) Notice: Subject to any disclaimer, the term of this patent is extended or adjusted under 35 U.S.C. 154(b) by 260 days.

(21) Appl. No.: 12/944,550

(22) Filed: Nov. 11, 2010

(51) Int. Cl.
*G06F 3/00* (2006.01)
*G06F 13/38* (2006.01)

(52) U.S. Cl.
USPC .................................. 710/60; 710/50; 710/52

(58) Field of Classification Search
USPC ................................................ 710/56, 60, 52
See application file for complete search history.

(56) References Cited

U.S. PATENT DOCUMENTS

| | | | | | |
|---|---|---|---|---|---|
| 5,317,725 | A | * | 5/1994 | Smith et al. | 714/27 |
| 5,727,002 | A | * | 3/1998 | Miller et al. | 714/748 |
| 5,890,014 | A | * | 3/1999 | Long | 710/8 |
| 6,724,732 | B1 | * | 4/2004 | Abrams et al. | 370/252 |
| 2004/0267982 | A1 | * | 12/2004 | Jackson et al. | 710/52 |
| 2008/0016265 | A1 | * | 1/2008 | Oshikiri et al. | 710/309 |
| 2008/0117829 | A1 | * | 5/2008 | Nakano et al. | 370/247 |

OTHER PUBLICATIONS

Tarante//A, "Tarantella Secure Global Desktop Enterprise Edition Software," Adaptive Internet Protocol; Tarantella, Inc.; Technical White Paper, 11 pages; Feb. 2004; found at http://www.filibeto.org/sun/sgd-users/lib/AIP.pdf.
Yangcheng Huang, et al., "Self-tuning Network Support for MANETs," 8 pages; printed on Feb. 2, 2011 from http://citeseerx.ist.psu.edu/viewdoc/summary?doi=10.1.1.150.7019.
Manish Anand, et al., "Self-tuning wireless network power management," MobiCom '03; 2 page abstract; 2003; found at http://portal.acm.org/citation.cfm?id=939004.
J. Maenpaa, et al., A Self-tuning Distributed Hash Table (DHT) for Resource Location and Discovery (RELOAD); IETF Jan. 2011; 20 pages; found at https://datatracker.ietf.org/doc/draft-ietf-p2psip-self-tuning/.
CommVault Data Backup and Recovery Software: Business Backup Solutions, "Simpana® Backup and Recovery," 2011; 2 pages; found at http://www.commvault.com/pdf/CommVault_GalaxyBackupandRecovery.pdf.

\* cited by examiner

*Primary Examiner* — Idriss N Alrobaye
*Assistant Examiner* — Farley Abad
(74) *Attorney, Agent, or Firm* — Wilmer Cutler Pickering Hale and Dorr LLP (57) ABSTRACT

Techniques for adaptive data transfer are disclosed. In one particular exemplary embodiment, the techniques may be realized as a method for adaptive data transfer comprising receiving a write request at an application protocol layer, buffering the write request, transferring to electronic storage a first portion of data of the buffered write request using a first setting value in a range, measuring, a transfer rate of the first portion of transferred data, varying the first setting value by a small amount in a first direction to identify a second setting value, transferring to electronic storage a second portion of data of the buffered write request using the second setting value, measuring a transfer rate of the second portion of transferred data, and replacing the first setting value with the second setting value if the transfer rate of the second portion of transferred data is greater than the first transfer rate.

20 Claims, 5 Drawing Sheets

Fig. 5

TECHNIQUES FOR ADAPTIVE DATA TRANSFER

FIELD OF THE DISCLOSURE

The present disclosure relates generally to data transfer and, more particularly, to techniques for adaptive data transfer.

BACKGROUND OF THE DISCLOSURE

Networks may be required to handle larger data transfers with increasing use of networked storage such as, for example, cloud based storage, for data backup, data archival, and other data needs. Clients of network based storage may not be aware of other clients competing for available network bandwidth and/or storage transfer bandwidth. Network conditions and bandwidth may vary over time and a single set of data transfer settings may not perform optimally for data transfer.

In view of the foregoing, it may be understood that there may be significant problems and shortcomings associated with current data transfer technologies.

SUMMARY OF THE DISCLOSURE

Techniques for adaptive data transfer are disclosed. In one particular exemplary embodiment, the techniques may be realized as a method for adaptive data transfer comprising receiving a write request at an application protocol layer, buffering the write request, transferring to electronic storage a first portion of data of the buffered write request using a first setting value in a range, measuring, using at least one computer processor, a transfer rate of the first portion of transferred data, varying the first setting value by a small amount in a first direction to identify a second setting value, transferring to electronic storage a second portion of data of the buffered write request using the second setting value, measuring a transfer rate of the second portion of transferred data, replacing the first setting value with the second setting value if the transfer rate of the second portion of transferred data is greater than the transfer rate of the first portion of transferred data, and varying the first setting value by a small amount in a second direction if the transfer rate of the second portion of transferred data is less than the transfer rate of the first portion of transferred data to identify a third setting value.

In accordance with other aspects of this particular exemplary embodiment, the techniques may include transferring to electronic storage a third portion of data of the buffered write request using the third setting value, measuring a transfer rate of the third portion of transferred data, and replacing the first setting value with the third setting value if the transfer rate of the third portion of transferred data is greater than the transfer rate of the first portion of transferred data.

In accordance with further aspects of this particular exemplary embodiment, the techniques may include continuing subsequent incremental changes and corresponding measurements of performance in a direction if performance in the particular direction continues to improve.

In accordance with additional aspects of this particular exemplary embodiment, the techniques may include varying the first setting value by a large amount in a first direction, transferring to electronic storage a third portion of data of the buffered write request using the varied setting value, measuring a transfer rate of the third portion of transferred data, and replacing the first setting value with the varied setting value if the transfer rate of the third portion of transferred data is greater than the transfer rate of a portion of transferred data associated with the first setting value.

In accordance with additional aspects of this particular exemplary embodiment, the large variation in the setting value may comprise a setting value associated with a greater transfer rate than the first setting value and the large variation in the setting value is persisted as a global performance maximum.

In accordance with additional aspects of this particular exemplary embodiment, the techniques may include determining a median value of a plurality of previous global performance maximums, and using the determined median value of the plurality of previous global performance maximums during subsequent instantiations of a transfer component.

In accordance with additional aspects of this particular exemplary embodiment, the setting value may comprise buffer size.

In accordance with additional aspects of this particular exemplary embodiment, the setting value may comprise IP priority.

In accordance with additional aspects of this particular exemplary embodiment, the techniques may include alternating settings for which a value is manipulated to provide optimization of a plurality of transfer settings.

In accordance with additional aspects of this particular exemplary embodiment, the baseline may be persisted and subsequent instantiations of a transfer component may use the persisted baseline.

In accordance with additional aspects of this particular exemplary embodiment, the baseline setting value in a specified range for the transfer of the first portion of data may comprise an arbitrary setting value.

In accordance with additional aspects of this particular exemplary embodiment, the techniques may include persisting a plurality of setting values as baseline values, and correlating one or more network conditions with each of the plurality of persisted baseline values.

In accordance with additional aspects of this particular exemplary embodiment, the techniques may include comparing network conditions at a time of the received write request with the one or more network conditions correlated with each of the plurality of persisted baseline values, and identifying a baseline value of the plurality of persisted baseline values to use for the transferring to electronic storage of the first portion of data based at least in part on the comparison.

In accordance with additional aspects of this particular exemplary embodiment, the techniques may be realized as at least one non-transitory processor readable storage medium for storing a computer program of instructions configured to be readable by at least one processor for instructing the at least one processor to execute a computer process for performing the method.

In another particular exemplary embodiment, the techniques may be realized as an article of manufacture for adaptive data transfer, the article of manufacture may comprise at least one non-transitory processor readable medium, and instructions stored on the at least one medium. The instructions may be configured to be readable from the at least one medium by at least one processor and thereby cause the at least one processor to operate so as to receive a write request at an application protocol layer, buffer the write request, transfer to electronic storage a first portion of data of the buffered write request using a first setting value in a range, measure a transfer rate of the first portion of transferred data, vary the first setting value by a small amount in a first direction to identify a second setting value, transfer to electronic storage a second portion of data of the buffered write request using the second setting value, measure a transfer rate of the second portion of transferred data, replace the first setting value with the second setting value if the transfer rate of the second portion of transferred data is greater than the transfer rate of the first portion of transferred data, and vary the first setting value by a small amount in a second direction if the transfer rate of the second portion of transferred data is less than the transfer rate of the first portion of transferred data to identify a third setting value.

In yet another particular exemplary embodiment, the techniques may be realized as a system for adaptive data transfer comprising one or more processors communicatively coupled to a network, wherein the one or more processors are configured to receive a write request at an application protocol layer, buffer the write request, transfer to electronic storage a first portion of data of the buffered write request using a first setting value in a range, measure a transfer rate of the first portion of transferred data, vary the first setting value by a small amount in a first direction to identify a second setting value, transfer to electronic storage a second portion of data of the buffered write request using the second setting value, measure a transfer rate of the second portion of transferred data, replace the first setting value with the second setting value if the transfer rate of the second portion of transferred data is greater than the transfer rate of the first portion of transferred data, and vary the first setting value by a small amount in a second direction if the transfer rate of the second portion of transferred data is less than the transfer rate of the first portion of transferred data to identify a third setting value.

In accordance with additional aspects of this particular exemplary embodiment, the processors may further be configured to transfer to electronic storage a third portion of data of the buffered write request using the third setting value, measure a transfer rate of the third portion of transferred data, and replace the baseline setting value with the third setting value if the transfer rate of the third portion of transferred data is greater than the transfer rate of the first portion of transferred data.

In accordance with additional aspects of this particular exemplary embodiment, the processors may further be configured to vary the setting value by a large amount in a first direction, transfer to electronic storage a third portion of data of the buffered write request using the varied setting value, measure a transfer rate of the third portion of transferred data, and replace the baseline setting value with the varied setting value if the transfer rate of the third portion of transferred data is greater than the transfer rate of a portion of transferred data associated with the first setting value.

In accordance with additional aspects of this particular exemplary embodiment, the processors may further be configured to persist a plurality of setting values as baseline values, and correlate one or more network conditions with each of the plurality of persisted baseline values.

In accordance with additional aspects of this particular exemplary embodiment, the processors may further be configured to compare network conditions at a time of the received write request with the one or more network conditions correlated with each of the plurality of persisted baseline values, and identify a baseline value of the plurality of persisted baseline values to use for the transferring to electronic storage of the first portion of data based at least in part on the comparison.

The present disclosure will now be described in more detail with reference to exemplary embodiments thereof as shown in the accompanying drawings. While the present disclosure is described below with reference to exemplary embodiments, it should be understood that the present disclosure is not limited thereto. Those of ordinary skill in the art having access to the teachings herein will recognize additional implementations, modifications, and embodiments, as well as other fields of use, which are within the scope of the present disclosure as described herein, and with respect to which the present disclosure may be of significant utility.

BRIEF DESCRIPTION OF THE DRAWINGS

In order to facilitate a fuller understanding of the present disclosure, reference is now made to the accompanying drawings, in which like elements are referenced with like numerals. These drawings should not be construed as limiting the present disclosure, but are intended to be exemplary only.

DETAILED DESCRIPTION OF EXEMPLARY EMBODIMENTS

Figure 1:
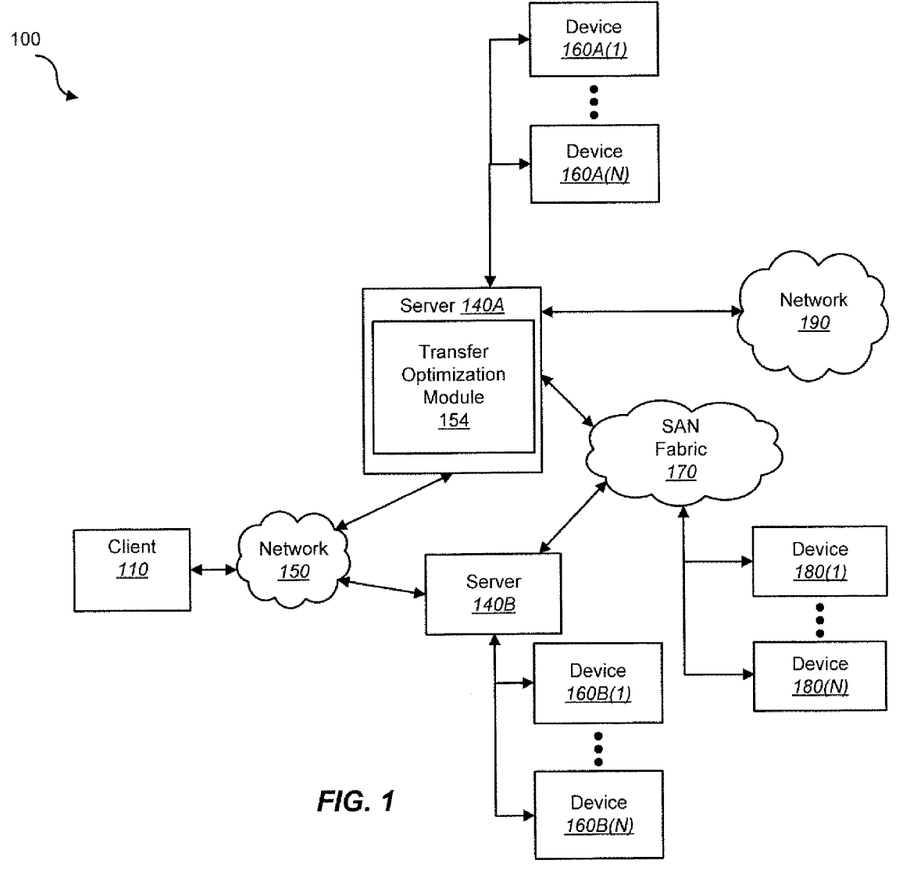
FIG. 1 shows a block diagram depicting a network architecture containing a platform for adaptive data transfer in accordance with an embodiment of the present disclosure.

FIG. 1 shows a block diagram depicting a network architecture 100 for adaptive data transfer in accordance with an embodiment of the present disclosure. FIG. 1 is a simplified view of network architecture 100, which may include additional elements that are not depicted. Network architecture 100 may contain client system 110 as well as servers 140A and 140B (one or more of which may be implemented using computer system 200 shown in FIG. 2). Client system 110 may be communicatively coupled to a network 150. Server 140A may be communicatively coupled to storage devices 160A(1)-(N), and server 140E may be communicatively coupled to storage devices 160B(1)-(N). Servers 140A and 140B may be communicatively coupled to a SAN (Storage Area Network) fabric 170. SAN fabric 170 may support access to storage devices 180(1)-(N) by servers 140A and 140B, and by client system 110 via network 150. Server 140A may be communicatively coupled to network 190.

The description below describes network elements, computers, and/or components of a system and method for adaptive data transfer that may include one or more modules. As used herein, the term "module" may be understood to refer to computing software, firmware, hardware, and/or various combinations thereof. Modules, however, are not to be interpreted as software which is not implemented on hardware, firmware, or recorded on a processor readable recordable storage medium (i.e., modules are not software per se). It is noted that the modules are exemplary. The modules may be combined, integrated, separated, and/or duplicated to support various applications. Also, a function described herein as being performed at a particular module may be performed at one or more other modules and/or by one or more other devices instead of or in addition to the function performed at the particular module. Further, the modules may be implemented across multiple devices and/or other components local or remote to one another. Additionally, the modules may be moved from one device and added to another device, and/or may be included in both devices.

Server 140A may be a platform containing transfer optimization module 154.

Figure 2:
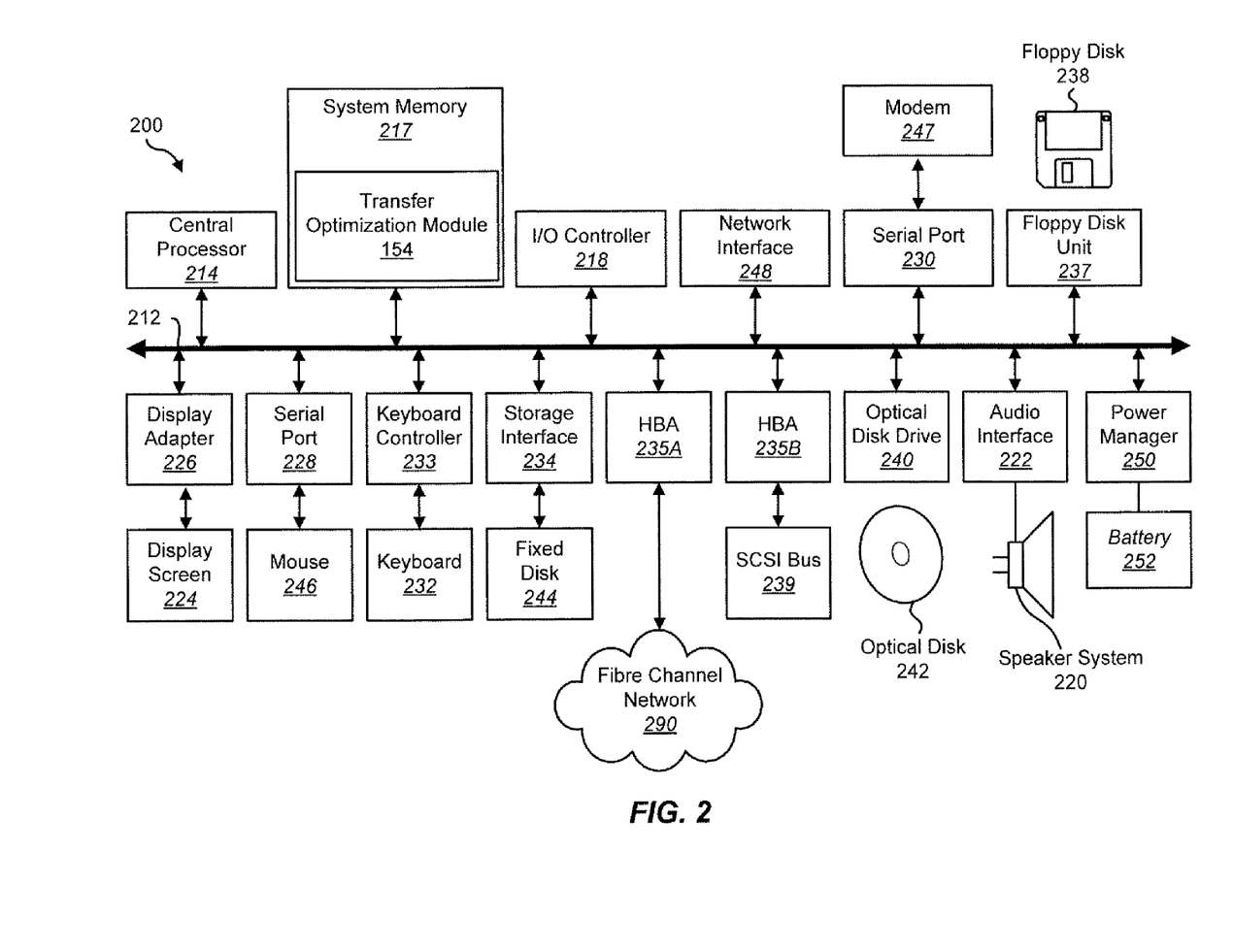
FIG. 2 depicts a block diagram of a computer system in accordance with an embodiment of the present disclosure.

With reference to computer system 200 of FIG. 2, modem 247, network interface 248, or some other method may be used to provide connectivity from one or more of client system 110 to network 150. Client system 110 may be able to access information on server 140A or 140B using, for example, a web browser or other client software. Such a client may allow client system 110 to access data hosted by server 140A or 140B or one of storage devices 160A(1)-(N), 160B(1)-(N), and/or 180(1)-(N).

Networks 150 and 190 may be local area networks (LANs), wide area networks (WANs), the Internet, cellular networks, satellite networks, or other networks that permit communication between client 110, servers 140, and other devices communicatively coupled to networks 150 and 190. Networks 150 and 190 may further include one, or any number, of the exemplary types of networks mentioned above operating as a stand-alone network or in cooperation with each other. Networks 150 and 190 may utilize one or more protocols of one or more clients or servers to which they are communicatively coupled. Networks 150 and 190 may translate to or from other protocols to one or more protocols of network devices. Although networks 150 and 190 are each depicted as one network, it should be appreciated that according to one or more embodiments, networks 150 and 190 may each comprise a plurality of interconnected networks.

Storage devices 160A(1)-(N), 160B(1)-(N), and/or 180(1)-(N) may be network accessible storage and may be local, remote, or a combination thereof to server 140A or 140B. Storage devices 160A(1)-(N), 160B(1)-(N), and/or 180(1)-(N) may utilize a redundant array of inexpensive disks ("RAID"), magnetic tape, disk, a storage area network ("SAN"), an internet small computer systems interface ("iSCSI") SAN, a Fibre Channel SAN, a common Internet File System ("CIFS"), network attached storage ("NAS"), a network file system ("NFS"), optical based storage, or other computer accessible storage. Storage devices 160A(1)-(N), 160B(1)-(N), and/or 180(1)-(N) may be used for backup or archival purposes.

According to some embodiments, client 110 may be a smartphone, PDA, desktop computer, a laptop computer, a server, another computer, or another device coupled via a wireless or wired connection to network 150, Client 110 may receive data from user input, a database, a file, a web service, and/or an application programming interface.

Servers 140A and 140B may be application servers, archival platforms, backup servers, network storage devices, media servers, email servers, document management platforms, enterprise search servers, or other devices communicatively coupled to network 150. Servers 140A and 140B may utilize one of storage devices 160A(1)-(N), 160B(1)-(N), and/or 180(1)-(N) for the storage of application data, backup data, or other data. Servers 140A and 140B may be hosts, such as an application server, which may process data traveling between client 110 and a backup platform, a backup process, and/or storage. According to some embodiments, servers 140A and 140B may be platforms used for backing up and/or archiving data.

Transfer optimization module 154 may monitor, adjust, and/or optimize one or settings which may improve a data transfer rate and/or manage a data transfer rate. According to some embodiments, transfer optimization module 154 may operate at an application protocol layer such as, for example, a higher level protocol including, but not limited to Simple Object Access Protocol (SOAP) and Representational State Transfer (REST).

A protocol externalized by many cloud based storage providers may be built around the notion of web services using either (or both) a REST or SOAP based protocol. Overall performance of data transfer (e.g., a data protection application interfacing with a cloud based storage provider) may be most significantly influenced by the transfer cost of the actual payload data. Control traffic may be, for the most part, less significant with regards to data transfer performance (e.g., backup or restore performance).

Managing one or more transfer parameters at a higher level protocol may provide advantages. Fixed parameters (e.g., fixed payload sizes) may not adapt well to changing conditions. Parameters managed at a lower level (e.g., at an IP layer of an Ethernet driver) may be optimized for a specific application and may ignore current network conditions. Parameters managed at a lower level may also not account for congestion and challenges experienced at a higher level in a stack of protocols used to transfer data (e.g., no problems may be encountered at an IP protocol level, but a transfer may not be optimized due to conditions occurring at an upper layer).

Transfer optimization module 154 may buffer one or more requests at a higher protocol layer (e.g., requests between a data protection application and the cloud based storage provider may be buffered at a SOAP protocol level). Buffered data may be used for the physical transfer. A user may configure a range (e.g., an upper and lower limit of buffer sizes to use).

Transfer optimization module 154 may initially start a sequence of transfers at an arbitrary point within the specified range. The time it takes to complete a first transfer may be measured by Transfer optimization module 154. A second transfer may vary the previously used buffer size by a small amount (e.g., 1%-3%). Again, the time it takes to complete the transfer may be measured by transfer optimization module 154. If a second transfer measurement has a better performance than the first measurement, transfer optimization module 154 may continue making these small changes in the same direction at the application protocol layer, which either increases or decreases the buffer size. If the measurement has worse performance, the direction of change may be inverted. For example, if a first transfer uses a setting (e.g., buffer size of 100 MB) and a second transfer achieves a worse performance with a varied setting (e.g., a buffer size of 102 MB), a third transfer may have a same setting varied from the first setting value in an opposite direction from the second transfer (e.g., a buffer size of 98 MB). If a change in a setting results in an improvement in data transfer performance, the changed setting may become a new baseline. Additional variations of the setting in a same direction may be tested for performance in subsequent transfers (e.g., a third transfer may use a buffer size of 96 MB).

According to some embodiments, transfer optimization module 154 may manage a plurality of settings for one or more data transfers. Settings may include, but are not limited to, buffer size, IP priority, and latency. According to some embodiments, transfer optimization module 154 may vary a single setting per data transfer in order to isolate performance impacts of a change. For example, transfer optimization module 154 may vary a buffer size from an initial or baseline setting value for a first transfer. On a third or subsequent transfer transfer optimization module 154 may vary a second parameter setting such as, for example, IP priority. According to some embodiments, adjustments in a first parameter may continue until improvements in performance (e.g., a transfer rate) decline below a certain level. According to some embodiments, adjustments in a first parameter may be made for a specified number of transfers or over a specified period of time. Parameter or setting values may be ranked in order of importance or impact on performance. Transfer optimization module 154 may vary parameters according to a rank to determine an optimized setting first for highest ranked parameters. According to some embodiments, transfer optimization module 154 may track settings modification impacts on performance and may rank parameters according. According to some embodiments, modification and variance of one or more parameters by transfer optimization module 154 may user enabled and/or disabled. Ranking of parameters may also be user configurable. A user may additionally set a range for parameter variances (e.g., a minimum value and a maximum value).

According to some embodiments, transfer optimization module 154 may periodically induces a large variation of a setting value (e.g., every 20 transfers the buffer size may be varied by 20%-80% either up or down). If this larger variation results in better performance, a new baseline may be established, otherwise a prior baseline may be continued to be used. A new baseline that is established as a result of a larger variation of a setting may be a global performance maximum.

According to some embodiments, transfer optimization module 154 may persist a setting value resulting in improvements in data transfer performance (e.g., a base point buffer size). This may allow subsequent instances of a same component to start at a better setting value (e.g., a buffer size) than an initial arbitrary value. If a significant period of time has elapsed since the previous data transfer, different network conditions may be occurring. A transfer setting start value (a buffer size setting) may then be derived by picking the median value of previous global performance maximums.

According to some embodiments, transfer optimization module 154 may persist a plurality of baselines. Transfer optimization module 154 may persist metadata associated with a baseline including, but not limited to, network conditions at a time of transfer associated with a baseline, a time a transfer associated with a baseline occurred (e.g., twelve AM or twelve PM), a transfer size associated with a baseline, other settings associated with a baseline (e.g., a baseline may be associated with a particular buffer size and a particular IP priority or other transfer setting), and one or more conditions of a storage target receiving a transfer associated with a baseline. Transfer optimization module 154 may analyze one or more conditions present at a time of a transfer request and may map present conditions to metadata associated with a persisted baseline to identify an optimum starting value. Transfer optimization module 154 may identify a plurality of persisted baselines whose associated metadata indicate applicability of the baselines. If a plurality of persisted baselines are identified an average or other computation may be made to identify an optimum starting value for a transfer setting.

FIG. 2 depicts a block diagram of a computer system 200 in accordance with an embodiment of the present disclosure. Computer system 200 is suitable for implementing techniques in accordance with the present disclosure. Computer system 200 may include a bus 212 which may interconnect major subsystems of computer system 210, such as a central processor 214, a system memory 217 (e.g. RAM (Random Access Memory), ROM (Read Only Memory), flash RAM, or the like), an Input/Output (I/O) controller 218, an external audio device, such as a speaker system 220 via an audio output interface 222, an external device, such as a display screen 224 via display adapter 226, serial ports 228 and 230, a keyboard 232 (interfaced via a keyboard controller 233), a storage interface 234, a floppy disk drive 237 operative to receive a floppy disk 238, a host bus adapter (HBA) interface card 235A operative to connect with a Fibre Channel network 290, a host bus adapter (HBA) interface card 235B operative to connect to a SCSI bus 239, and an optical disk drive 240 operative to receive an optical disk 242. Also included may be a mouse 246 (or other point-and-click device, coupled to bus 212 via serial port 228), a modem 247 (coupled to bus 212 via serial port 230), network interface 248 (coupled directly to bus 212), power manager 250, and battery 252.

Bus 212 allows data communication between central processor 214 and system memory 217, which may include read-only memory (ROM) or flash memory (neither shown), and random access memory (RAM) (not shown), as previously noted. The RAM may be the main memory into which the operating system and application programs may be loaded. The ROM or flash memory can contain, among other code, the Basic Input-Output system (BIOS) which controls basic hardware operation such as the interaction with peripheral components. Applications resident with computer system 210 may be stored on and accessed via a computer readable medium, such as a hard disk drive (e.g., fixed disk 244), an optical drive (e.g., optical drive 240), a floppy disk unit 237, or other storage medium. For example, transfer optimization module 154 may be resident in system memory 217.

Storage interface 234, as with the other storage interfaces of computer system 210, can connect to a standard computer readable medium for storage and/or retrieval of information, such as a fixed disk drive 244. Fixed disk drive 244 may be a part of computer system 210 or may be separate and accessed through other interface systems. Modem 247 may provide a direct connection to a remote server via a telephone link or to the Internet via an Internet service provider (ISP). Network interface 248 may provide a direct connection to a remote server via a direct network link to the Internet via a POP (point of presence). Network interface 248 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 2 need not be present to practice the present disclosure. The devices and subsystems can be interconnected in different ways from that shown in FIG. 2. Code to implement the present disclosure may be stored in computer-readable storage media such as one or more of system memory 217, fixed disk 244, optical disk 242, or floppy disk 238. Code to implement the present disclosure may also be received via one or more interfaces and stored in memory. The operating system provided on computer system 210 may be MS-DOS®, MS-WINDOWS®, OS/2®, OS X®, UNIX®, Linux®, or another known operating system.

Power manager 250 may monitor a power level of battery 252. Power manager 250 may provide one or more APIs (Application Programming Interfaces) to allow determination of a power level, of a time window remaining prior to shutdown of computer system 200, a power consumption rate, an indicator of whether computer system is on mains (e.g., AC Power) or battery power, and other power related information. According to some embodiments, APIs of power manager 250 may be accessible remotely (e.g., accessible to a remote backup management module via a network connection). According to some embodiments, battery 252 may be an Uninterruptable Power Supply (UPS) located either local to or remote from computer system 200. In such embodiments, power manager 250 may provide information about a power level of an UPS.

Figure 3:
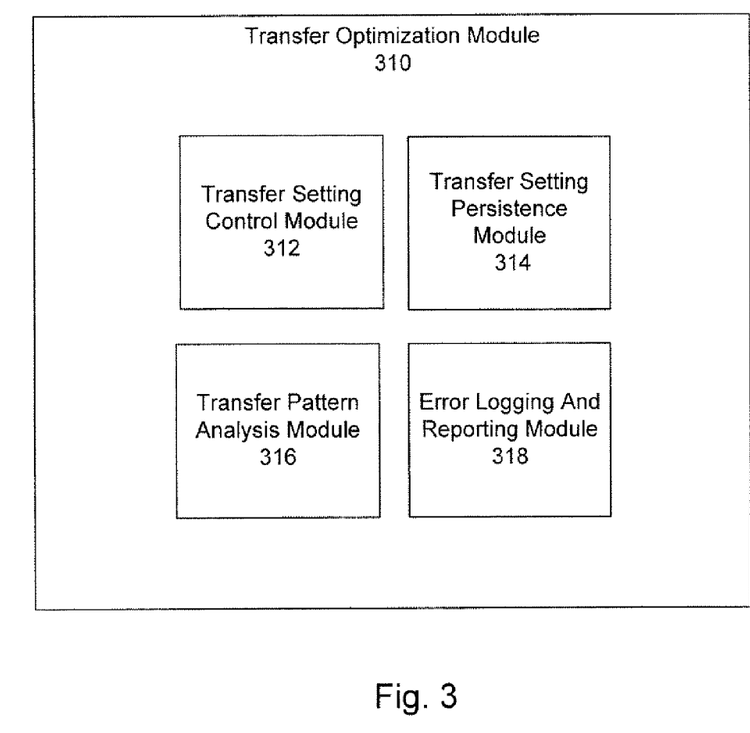
FIG. 3 shows a module for adaptive data transfer in accordance with an embodiment of the present disclosure.

Referring to FIG. 3, there is shown a transfer optimization management 310 in accordance with an embodiment of the present disclosure. As illustrated, the transfer optimization management 310 may contain one or more components including transfer setting control module 312, transfer setting persistence module 314, transfer pattern analysis module 316, and error logging and reporting module 318.

Transfer setting control module 312 may manage one or more settings used for data transfer. Transfer setting control module 312 may buffer a write request and transfer a first portion using a first setting value (e.g., an arbitrary setting value in a specified range). Transfer setting control module 312 may measure a corresponding transfer rate. Transfer setting control module 312 may transfer a second portion using a second setting value varied in a first direction by a small amount (e.g., 1-3% or another variance amount specified by a configurable setting). Transfer setting control module 312 may measure the second transfer rate. If the second transfer rate indicates improved performance, Transfer setting control module 312 may persist the setting value as a new baseline for the setting. Transfer setting control module 312 may perform a subsequent transfer varying a setting and additional small amount from the new baseline in the same direction (e.g., if the first transfer used a 100 MB buffer size and the second transfer using a 102 MB buffer size results in improved performance, the third transfer may use a 104 MB buffer size setting).

If the measurement has worse performance, Transfer setting control module 312 may invert the direction of change. For example, if a first transfer uses a setting (e.g., buffer size of 100 MB) and a second transfer achieves a worse performance with a varied setting (e.g., a buffer size of 102 MB), a third transfer may have a same setting varied from the first setting value in an opposite direction from the second transfer (e.g., a buffer size of 98 MB). If a change in a setting results in an improvement in data transfer performance, the changed setting may become a new baseline. Additional variations of the setting in a same direction may be tested for performance in subsequent transfers (e.g., a third transfer may use a buffer size of 96 MB).

According to some embodiments, Transfer setting control module 312 may periodically induces a large variation of a setting value (e.g., every 20 transfers the buffer size may be varied by 20%-80% either up or down, after a specified period of time a large variation may be implemented, or after a specified amount of data is transferred a large variation may be implemented). If this larger variation results in better performance, a new baseline may be established, otherwise a prior baseline may be continued to be used. A new baseline that is established as a result of a larger variation of a setting may be a global performance maximum.

Transfer setting persistence module 314 may persist a setting value resulting in improvements in data transfer performance (e.g., a base point buffer size). This may allow subsequent instances of a same component to start at a better setting value (e.g., a buffer size) than an initial arbitrary value. If a significant period of time has elapsed since the previous data transfer, different network conditions may be occurring. A transfer setting start value (a buffer size setting) may then be derived by picking the median value of previous global performance maximums.

According to some embodiments, Transfer setting persistence module 31 may persist a plurality of baselines. Transfer setting persistence module 31 may persist metadata associated with a baseline including, but not limited to, network conditions at a time of transfer associated with a baseline, a time a transfer associated with a baseline occurred (e.g., twelve AM or twelve PM), a transfer size associated with a baseline, other settings associated with a baseline (e.g., a baseline may be associated with a particular buffer size and a particular IP priority or other transfer setting), and one or more conditions of a storage target receiving a transfer associated with a baseline.

Transfer pattern analysis module 316 may analyze one or more conditions present at a time of a transfer request and may map present conditions to metadata associated with a persisted baseline to identify an optimum starting value. Transfer pattern analysis module 316 may identify a plurality of persisted baselines whose associated metadata indicate applicability of the baselines. If a plurality of persisted baselines are identified an average or other computation may be made to identify an optimum starting value for a transfer setting.

Error logging and reporting module 318 may produce logs, reports, or other information associated with adaptive data transfer.

Figure 4:
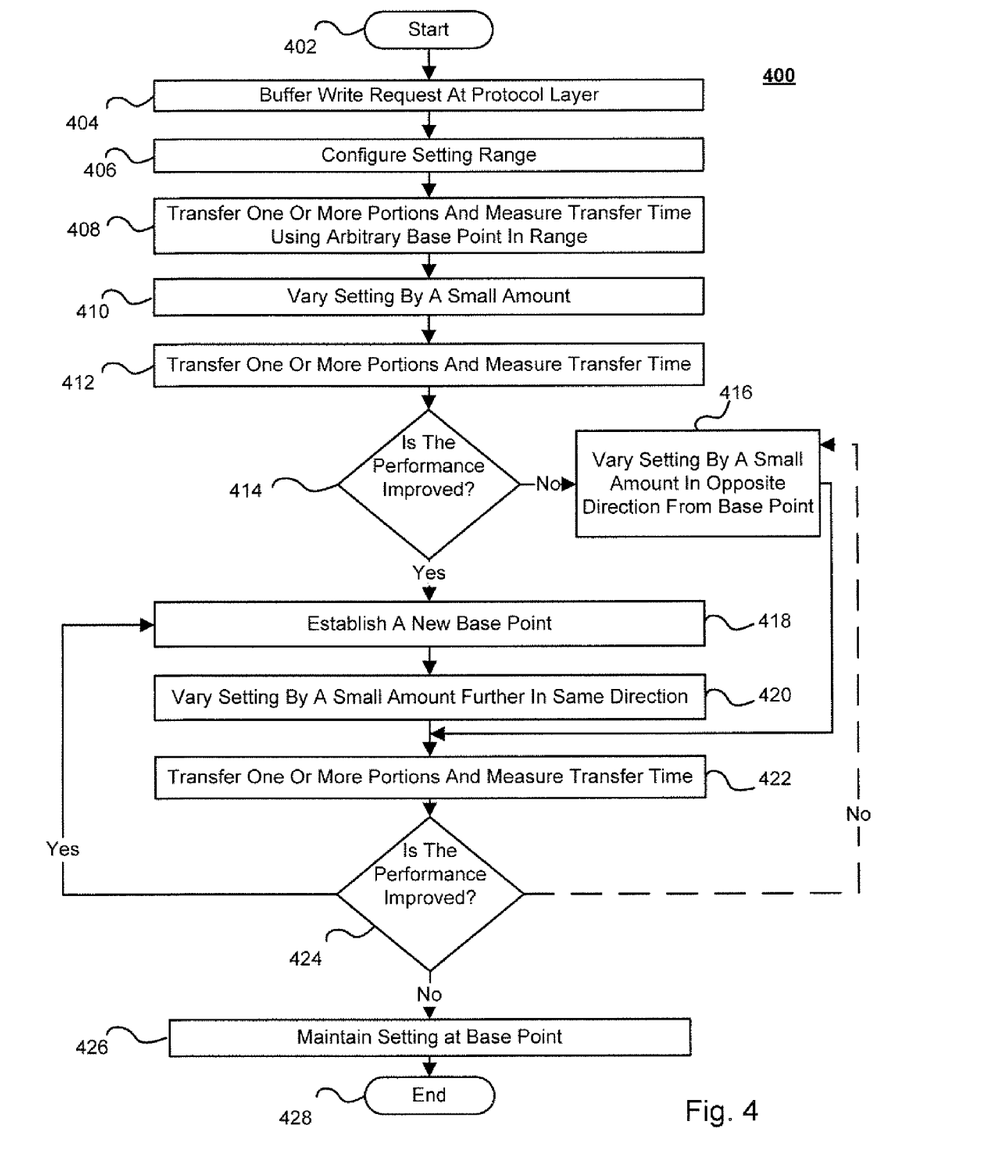
FIG. 4 depicts a method for adaptive data transfer for a read request in accordance with an embodiment of the present disclosure.

Referring to FIG. 4, there is depicted a method 400 for adaptive data transfer for a read request in accordance with an embodiment of the present disclosure. At block 402, the method 400 may begin.

At block 404, a write request may be buffered at an upper level protocol level. For example, buffering may occur at a higher level protocol including, but not limited to Simple Object Access Protocol (SOAP) and Representational State Transfer (REST).

At block 406, a setting range may be configured (e.g., a user interface may be provided allowing the configuration of one or more transfer settings including, but not limited to, a buffer size minimum, a buffer size maximum, a highest level IP priority, a lowest level IP priority, a maximum latency value, and a minimum latency value).

At block 408, a first portion of data may be transferred using a setting value (e.g., an arbitrary setting value within a configured range or a persisted setting baseline value) and a transfer time may be measured.

At block 410, the setting value may be varied in a first direction by a small amount (e.g., 1-3% or another variance amount specified by a configurable setting).

At block 412, a first portion of data may be transferred and a transfer time may be measured.

At block 414, it may be determined whether transfer performance improved from a first transfer to a second transfer.

If transfer performance improved, the method may continue at block 418. If transfer performance did not improve, the method may continue at block 416.

At block 416, the setting value may be varied by a small amount in a second direction from a setting value used for the first transfer.

At block 418, a new base point may be established. A base point may be persisted in electronic storage and may be associated with metadata including, but not limited to, network conditions at a time of transfer associated with a baseline, a time a transfer associated with a baseline occurred (e.g., twelve AM or twelve PM), a transfer size associated with a baseline, other settings associated with a baseline (e.g., a baseline may be associated with a particular buffer size and a particular IP priority or other transfer setting), and one or more conditions of a storage target receiving a transfer associated with a baseline.

According to some embodiments, variance of different settings may be performed. For example, after establishment of a base point for a buffer size, a second set of transfers may attempt to improve transfer performance by adjusting a second setting value (e.g., IP priority, latency, etc.). Adjustment of settings may depend on one or more configurations, on a protocol at which the adaptive data transfer is implemented, on historical performance of settings adjustments, on network conditions, and other factors. Thus, according to some embodiments, after establishing a base point for a first setting, the method may return to block 406 and configure a setting range for a second setting (or if a setting range for a second setting is pre-configured or persisted, the method may return to block 408).

At block 420, the setting may be varied by a small amount further in a same direction (e.g., if the second setting value increased a setting by 1-3%, the third setting value may increase the setting by an additional 1-3%.)

At block 422, one or more portions may be transferred using a varied setting value and the transfer time may be measured.

At block 424, it may be determined whether the transfer performance has improved. If the transfer performance has improved, the method may return to block 418 to set a new base point for the setting. If the performance has not improved, the method may continue to block 426. As shown by the dashed line according to some embodiments, the method may proceed to block 416 to test a data transfer with the setting varied in an opposite direction.

At block 426, the setting value may be maintained at a base point (e.g., for a short period of time while other settings are adjusted or while a larger variation in the setting value is tested as discussed in reference to FIG. 5 below).

At block 428, the method 400 may end.

Figure 5:
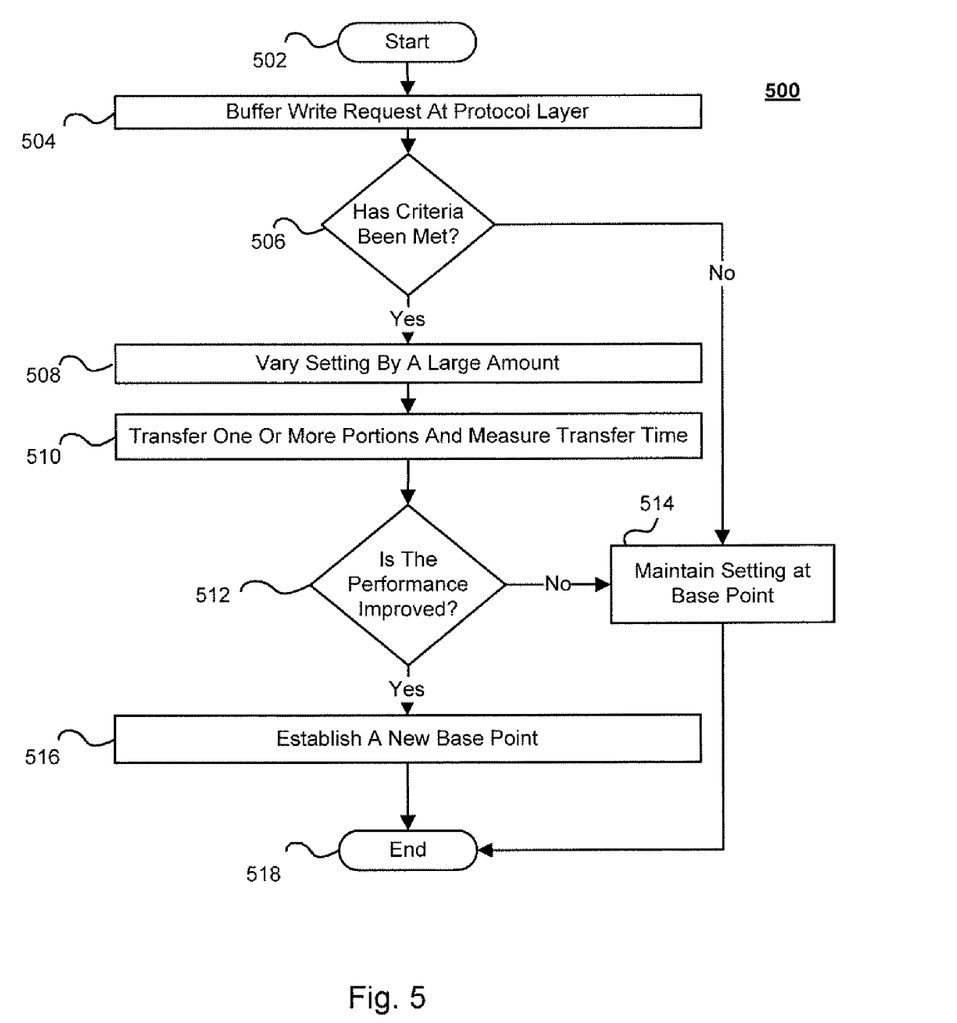
FIG. 5 depicts a method for adaptive data transfer for a write request in accordance with an embodiment of the present disclosure.

Referring to FIG. 5, there is depicted a method 500 for adaptive data transfer for a write request in accordance with an embodiment of the present disclosure. At block 502, the method 500 may begin.

At block 504, a write request may be buffered at an application level protocol layer. According to some embodiments, a write request may already be buffered (e.g., as part of small transfer setting variation testing discussed with respect to FIG. 4 above).

At block 506, it may be determined whether one or more criteria have been met (e.g., have a specified number of data transfers occurred, has a specified period of time elapsed, where one or more network conditions detected, has a specified amount of data been transferred, etc.). If one or more criteria have been met, the method may continue at block 508. If one or more criteria have not been met the method may continue at block 518.

At block 508, a large variation of a setting value may be made (e.g., the buffer size may be varied by 20%-80% either up or down).

At block 510, one or more portions of data may be transferred using the varied setting and the transfer performance may be measured.

At block 512, the performance of a new setting value may be evaluated. If this larger variation results in better performance the method may continue at block 516. If this larger variation results in decreased performance the method may continue at block 514.

At block 514, an existing baseline may be continued to be used. According to some embodiments, a large variation in an opposite direction may be made (e.g., if a first large variation increasing a buffer size by 50% resulted in decreased performance, a second variation decreasing a buffer size by 60% may be made and the method may return to block 510).

At block 516, a new baseline may be established. A new baseline that is established as a result of a larger variation of a setting may be a global performance maximum.

At block 518, the method 500 may end.

At this point it should be noted that adaptive data transfer in accordance with the present disclosure as described above typically involves the processing of input data and the generation of output data to some extent. This input data processing and output data generation may be implemented in hardware or software. For example, specific electronic components may be employed in an adaptive data transfer module or similar or related circuitry for implementing the functions associated with adaptive data transfer in accordance with the present disclosure as described above. Alternatively, one or more processors operating in accordance with instructions may implement the functions associated with adaptive data transfer in accordance with the present disclosure as described above.

If such is the case, it is within the scope of the present disclosure that such instructions may be stored on one or more processor readable storage media (e.g., a magnetic disk or other storage medium), or transmitted to one or more processors via one or more signals embodied in one or more carrier waves.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

The invention claimed is:

1. A method for adaptive data transfer comprising:
receiving a write request at an application protocol layer;
buffering the write request;
transferring to electronic storage a first portion of data of the buffered write request using a first setting value in a range;
measuring, using at least one computer processor, a transfer rate of the first portion of transferred data;
varying the first setting value by a first amount in a first direction to identify a second setting value, wherein the first amount is within a specified percentage; transferring to electronic storage a second portion of data of the buffered write request using the second setting value;
measuring a transfer rate of the second portion of transferred data;
replacing the first setting value with the second setting value if the transfer rate of the second portion of transferred data is greater than the transfer rate of the first portion of transferred data;
varying the first setting value by a second amount in a second direction if the transfer rate of the second portion of transferred data is less than the transfer rate of the first portion of transferred data to identify a third setting value;

varying the first setting value by a third amount in either the first direction or the second direction in response to at least one of: a specified period of time elapsing, a specified amount of data being transferred, a specified number of transfers completed, and a network condition detected, wherein the third amount is greater than the first amount and wherein the third amount is greater than the second amount;

transferring to electronic storage a third portion of data of the buffered write request using the varied setting value;

measuring a transfer rate of the third portion of transferred data; and replacing the first setting value with the varied setting value if the transfer rate of the third portion of transferred data is greater than the transfer rate of a portion of transferred data associated with the first setting value.

2. The method of claim 1, further comprising continuing subsequent incremental changes and corresponding measurements of performance in a direction if performance in the particular direction continues to improve.

3. The method of claim 1, wherein the third amount is within a range of twenty to eighty percent.

4. The method of claim 1, wherein the third amount comprises a setting value associated with a greater transfer rate than the first setting value and the third amount is persisted as a global performance maximum.

5. The method of claim 4, further comprising:
determining a median value of a plurality of previous global performance maximums; and
using the determined median value of the plurality of previous global performance maximums during subsequent instantiations of a transfer component.

6. The method of claim 1, wherein the setting value comprises buffer size.

7. The method of claim 1, wherein the setting value comprises IP priority.

8. The method of claim 1, further comprising alternating settings for which a value is manipulated to provide optimization of a plurality of transfer settings.

9. The method of claim 1, wherein at least one of the first setting value, the second setting value, and the third setting is persisted as a baseline setting value and wherein subsequent instantiations of a transfer component use the persisted baseline setting value.

10. The method of claim 1, wherein the first setting value in a specified range for the transfer of the first portion of data comprises an arbitrary setting value.

11. The method of claim 1, further comprising:
persisting a plurality of setting values as baseline values; and
correlating one or more network conditions with each of the plurality of persisted baseline values.

12. The method of claim 11, further comprising:
comparing network conditions at a time of the received write request with the one or more network conditions correlated with each of the plurality of persisted baseline values; and
identifying a baseline value of the plurality of persisted baseline values to use for the transferring to electronic storage of the first portion of data based at least in part on the comparison.

13. At least one non-transitory processor readable storage medium for storing a computer program of instructions configured to be readable by at least one processor for instructing the at least one processor to execute a computer process for performing the method as recited in claim 1.

14. The method of claim 1, where the first amount and the second amount are equal.

15. An article of manufacture for adaptive data transfer, the article of manufacture comprising:
at least one non-transitory processor readable medium; and
instructions stored on the at least one medium;
wherein the instructions are configured to be readable from the at least one medium by at least one processor and thereby cause the at least one processor to operate so as to:
receive a write request at an application protocol layer;
buffer the write request;
transfer to electronic storage a first portion of data of the buffered write request using a first setting value in a range;
measure a transfer rate of the first portion of transferred data;
vary the first setting value by a first amount in a first direction to identify a second setting value, wherein the small amount is within a specified percentage;
transfer to electronic storage a second portion of data of the buffered write request using the second setting value;
measure a transfer rate of the second portion of transferred data;
replace the first setting value with the second setting value if the transfer rate of the second portion of transferred data is greater than the transfer rate of the first portion of transferred data;
vary the first setting value by a second amount in a second direction if the transfer rate of the second portion of transferred data is less than the transfer rate of the first portion of transferred data to identify a third setting value;
vary the first setting value by a third amount in either the first direction or the second direction in response to at least one of: a specified period of time elapsing, a specified amount of data being transferred, a specified number of transfers completed, and a network condition detected, wherein the third amount is greater than the first amount and wherein the third amount is greater than the second amount;
transfer to electronic storage a third portion of data of the buffered write request using the varied setting value;
measure a transfer rate of the third portion of transferred data; and
replace the first setting value with the varied setting value if the transfer rate of the third portion of transferred data is greater than the transfer rate of a portion of transferred data associated with the first setting value.

16. A system for adaptive data transfer comprising:
one or more processors communicatively coupled to a network; wherein the one or more processors are configured to:
receive a write request at an application protocol layer;
buffer the write request;
transfer to electronic storage a first portion of data of the buffered write request using a first setting value in a range;
measure a transfer rate of the first portion of transferred data;
vary the first setting value by a first amount in a first direction to identify a second setting value, wherein the first amount is within a specified percentage;
transfer to electronic storage a second portion of data of the buffered write request using the second setting value;
measure a transfer rate of the second portion of transferred data;

replace the first setting value with the second setting value if the transfer rate of the second portion of transferred data is greater than the transfer rate of the first portion of transferred data; and vary the first setting value by a second amount in a second direction if the transfer rate of the second portion of transferred data is less than the transfer rate of the first portion of transferred data to identify a third setting value;

vary the first setting value by a third amount in either the first direction or the second direction in response to at least one of: a specified period of time elapsing, a specified amount of data being transferred, a specified number of transfers completed, and a network condition detected, wherein the third amount is greater than the first amount and wherein the third amount is greater than the second amount;

transfer to electronic storage a third portion of data of the buffered write request using the varied setting value;

measure a transfer rate of the third portion of transferred data; and replace the first setting value with the varied setting value if the transfer rate of the third portion of transferred data is greater than the transfer rate of a portion of transferred data associated with the first setting value.

17. The system of claim 16, wherein the amount is within a specified percentage.

18. The system of claim 16, wherein the processors are further configured to:
persist a plurality of setting values as baseline values; and
correlate one or more network conditions with each of the plurality of persisted baseline values.

19. The system of claim 18, wherein the processors are further configured to:
compare network conditions at a time of the received write request with the one or more network conditions correlated with each of the plurality of persisted baseline values; and
identify a baseline value of the plurality of persisted baseline values to use for the transferring to electronic storage of the first portion of data based at least in part on the comparison.

20. The system of claim 16, wherein the first amount and the second amount are in the range one percent to three percent.

* * * * *